United States Patent
Sager

[15] 3,663,330
[45] May 16, 1972

[54] METHOD AND APPARATUS FOR MAKING BIAS-LAID PRODUCTS

[72] Inventor: Karl E. Sager, Appleton, Wis.
[73] Assignee: Kimberly-Clark Corporation, Neenah, Wis.
[22] Filed: Mar. 31, 1970
[21] Appl. No.: 24,216

[52] U.S. Cl..............................156/190, 156/174, 156/193, 156/195
[51] Int. Cl.......................................................B65h 81/04
[58] Field of Search..................156/184, 190, 194, 193, 195, 156/173, 174, 188, 187

[56] References Cited

UNITED STATES PATENTS

| | | | |
|---|---|---|---|
| 1,604,273 | 10/1926 | Gammeter | 156/194 X |
| 3,533,883 | 10/1970 | Gartaganis et al. | 156/188 X |
| 3,488,242 | 1/1970 | Berry | 156/195 X |
| 3,515,621 | 6/1970 | Watson | 156/190 X |
| 1,504,255 | 8/1924 | MacDonald | 156/193 |
| 3,157,545 | 11/1964 | Waldron et al. | 156/193 X |

*Primary Examiner*—Benjamin R. Padgett
*Assistant Examiner*—Gary G. Solyst
*Attorney*—Wolfe, Hubbard, Leydig, Voit & Osann, Ltd.

[57] ABSTRACT

Apparatus and method for making a multi-ply web product having at least two plies at different angles with respect to the web. An endless belt is looped helically around a cylindrical mandrel; an optional first ply is laid longitudinally along the belt. As the belt moves a second ply is wrapped helically around the first helix but at a different angle. A third ply is also wrapped around the mandrel, belt, and first ply, and this is at an angle different from the second ply. Finally, the second and third plies are cut by slitting along the edge of the belt.

11 Claims, 5 Drawing Figures

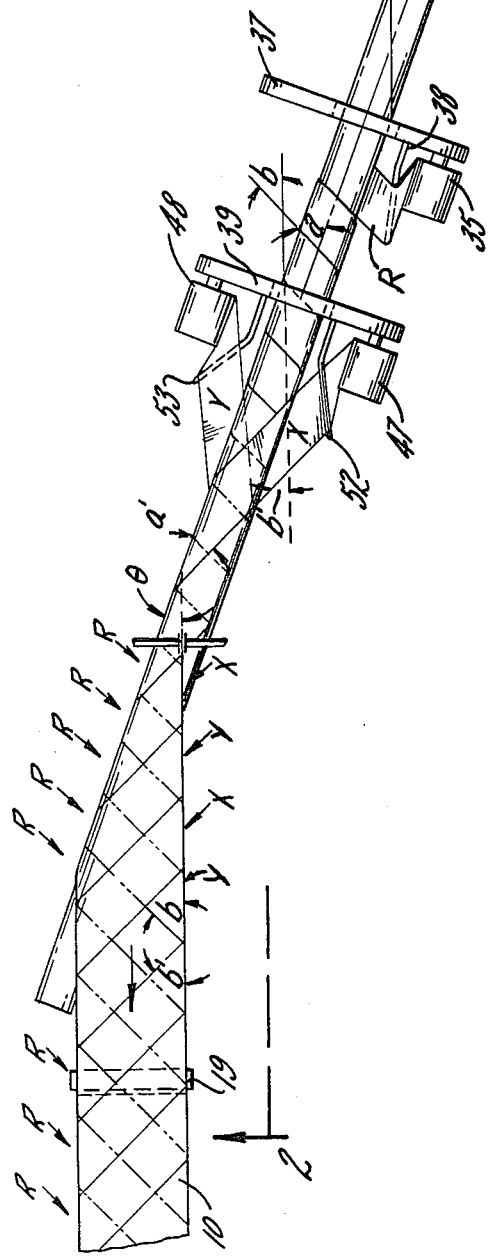

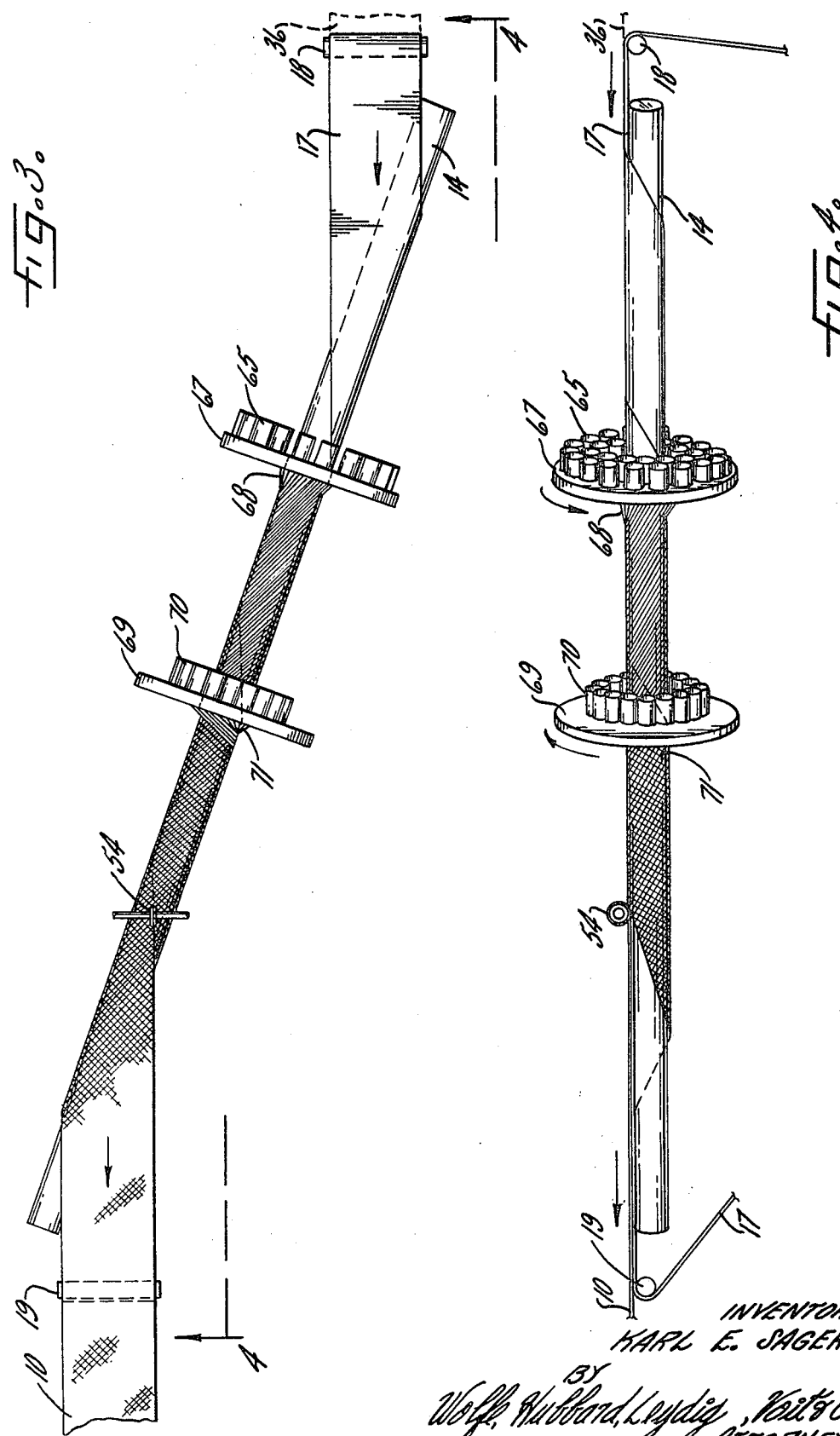

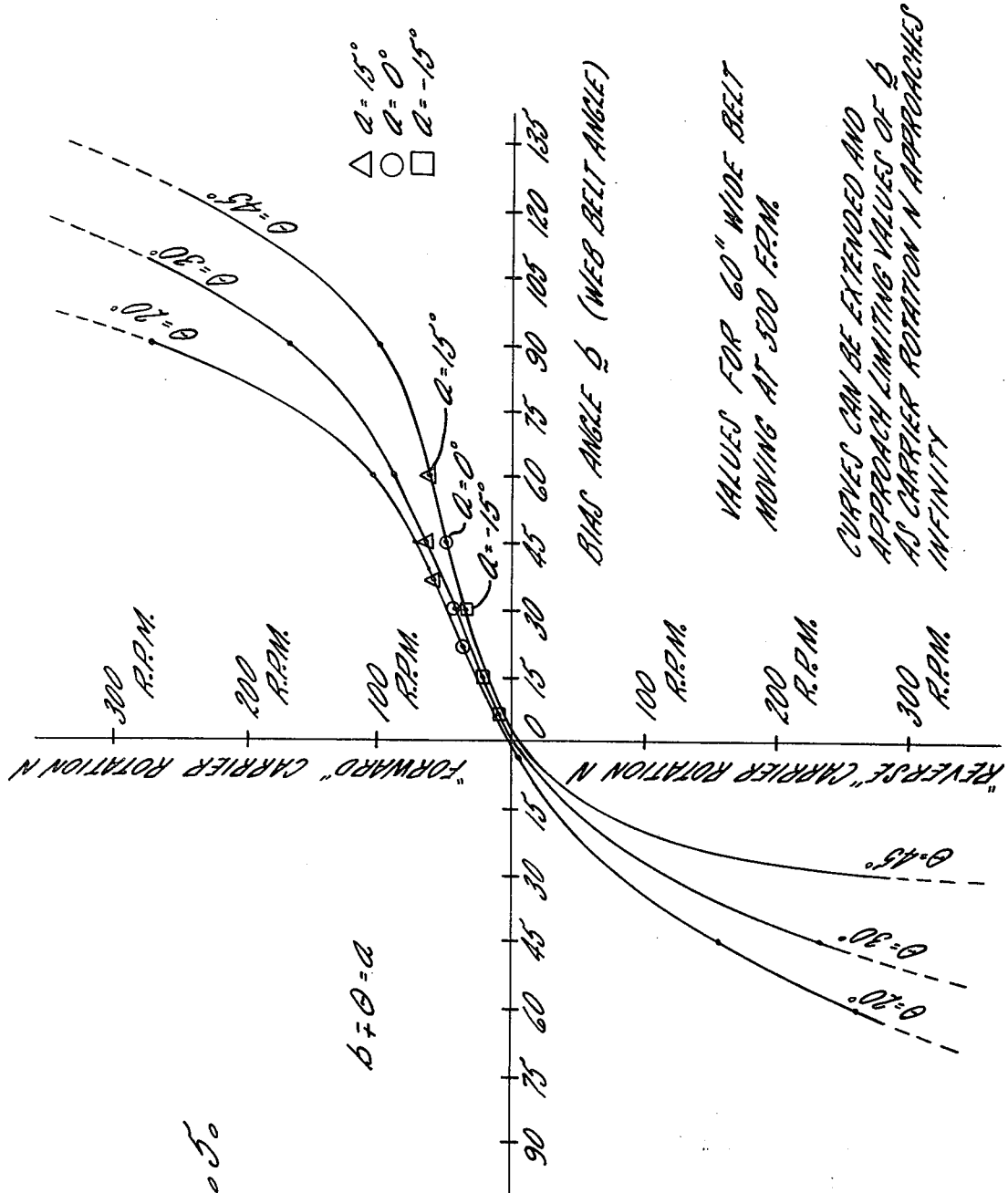

METHOD AND APPARATUS FOR MAKING BIAS-LAID PRODUCTS

CROSS-REFERENCE TO RELATED APPLICATIONS

William H. Burger Ser. No. 604,705, filed Dec. 27, 1966.

BACKGROUND AND OBJECTS

The present invention relates to a method and apparatus for forming a multi-ply web product, that is, an elongated web composed of several layers of initially discrete plies. More particularly, the invention provides a multi-ply web product having at least two plies at different angles.

While the present invention has applicability to the manufacture of numerous types of products of widely different characteristics, it will be described with particular reference to the field of non-woven web and thread textile products.

Non-woven webs composed of natural or synthetic polymeric fibers are now of widespread use in the manufacture of disposable clothing. Although non-woven webs have desirable appearance and characteristics, thus far there have been certain recognized limitations in both.

A major drawback to the use of non-woven webs has, of course, been their inherent lack of isotropic strength, conformability, and stretch in comparison with a woven or knitted material. The strength of a non-woven web in a given direction is directly related to the relative number of fibers of the web extending in that direction. When, as is common, the fibers are highly carded, or aligned, strength of the resulting web is satisfactory in the lengthwise or machine direction, but in any transverse direction is deficient or, in some instances, non-existent.

The practice has accordingly developed of reinforcing a non-woven web with a second non-woven ply at a bias or transverse angle with respect to the web. Alternatively, the bias plies may be a series of spaced-apart bias threads laid along one or both surfaces of the web. Webs of these types thus combine the attractiveness and low cost of non-woven webs with much of the strength of woven fabrics.

Unfortunately it is quite difficult to make a multi-ply web at the high speeds required for economic manufacture of non-woven material. High speed apparatus is available, as for example in commonly assigned H. W. Hirschy U.S. Pat. No. 2,841,202, but is primarily useful in making webs where the bias or reinforcing ply is at right angles to the web. The resulting web has good strength in the machine direction and in a direction at right angles to the machine direction, but strength falls off markedly when stress is applied at intermediate angles. A principal object of the invention, therefore, is to provide a method and apparatus for making multi-ply webs wherein the web has maximum strength in more than two directions.

Another object of the invention is to make a non-woven multi-ply web having high stretch, comformability and energy absorbing capacity in the machine and transverse directions of the web.

An associated object is to provide method and apparatus for forming a multi-ply web product wherein the resulting web has two or more plies at different angles. A more particular object is to provide webs having bias plies at 45° forward angle and 45° reverse angle with respect to the machine direction. An object of an alternative specific embodiment is to provide an isotropic multi-ply web having substantially equal strength in all directions, the web having bias plies laid at 60° angles with respect to the machine direction. Implicit in the foregoing, a further object is to provide a method and apparatus capable of forming a multi-ply web product having two, three or even more plies transverse to the web, and at virtually any preselected bias angle.

An additional object is to provide an apparatus and method for making multi-ply web products capable of forming bias plies of a sheet of non-woven material, or of reinforcing threads, or of any combination thereof.

A further object is to provide such method and apparatus capable of the high speed, low cost, efficient manufacture of reinforced multi-ply webs.

Other and further objects, aims, and advantages will become apparent from the ensuing specification, which is to be read in conjunction with the annexed drawings.

BRIEF DESCRIPTION OF DRAWINGS

FIG. 1 is a schematic top view of an apparatus embodying the invention, and adapted for forming a multi-ply product having two plies of web material, each at transverse angles with respect to the final web product;

FIG. 2 is a view taken along 2—2 of FIG. 1;

FIG. 3 is a top view of an apparatus embodying the invention for use in making a web product having two plies of thread material at different angles transverse to the web product;

FIG. 4 is a front view, along 4—4, of the apparatus of FIG. 3; and

FIG. 5 is a graph useful in visualizing the mathematical relationship expressed herein.

While the invention is susceptible of various modifications and alternative forms, certain specific embodiments thereof have been shown by way of example in the drawings and will be described in detail herein. It should be understood, however, that it is not intended to limit the invention to the particular forms disclosed but, on the contrary, the intention is to cover all modifications, equivalents, and alternatives falling within the spirit and scope of the invention.

DETAILED DESCRIPTION

Turning first to FIGS. 1 and 2 in combination, these figures schematically depict an apparatus for forming a multi-ply web wherein at least two bias plies of sheet or web material are laid at different angles with respect to the machine direction of the final web product 10. As will be explained, the product 10 may have an initial or foundation ply 36 aligned in the machine direction of the product 10 in addition to having the two cross-bias plies.

Briefly, a flexible belt 17 is wrapped helically about an elongated, generally cylindrical mandrel 14. The mandrel 14 is advantageously non-rotatable, and as described in Hirschy U.S. Pat. No. 2,841,202 may be heated to activate thermoplastic or thermosetting adhesives applied to one or more of the plies to bond the plies into a unitary web product 10. Also, the mandrel 14 may have a guide flange positioned helically around the mandrel 14 so as to guide the belt 17 in its helical path. To facilitate low-frictional movement of the belt with respect to the mandrel 14, the latter is advantageously provided with a polished surface or one having a deposited layer of low-friction material such as polytetrafluoroethylene, and may include a multitude of perforations to supply a buoyant layer of air under pressure to the underside of the belt 17 as a pneumatic lubricant.

As shown in FIGS. 1 and 2, the belt 17 is advantageously wrapped around the mandrel 14 at least three complete times. While this is not essential, inasmuch as it generally is preferably to have an acute angle $\theta$ between the belt 17 and the mandrel 14 axis, several turns of the belt 17 around the mandrel 14 are generally necessary to provide clearance for the rotating carriers 37, 39 which apply the bias web plies onto the belt 17.

As best shown in FIG. 2, the belt 17 is an elongated flexible endless belt, entering from a tension roll 18 and withdrawn from the mandrel 14 by a second roll 19, which itself may be driven or the belt may be driven by other rolls, not shown, in the portion of the belt system which restores the lateral offset of the belt 17 produced by the mandrel 14.

As the belt 17 is moved helically about the mandrel 14, two plies or webs of material are deposited on the belt, but at angles different from the angle $\theta$ between the belt and the mandrel 14 axis. The first web R is wrapped around the belt 17 and its underlying mandrel 14 from a rotating carrier 37, which rotates in a clockwise direction as viewed from the end of the mandrel 14 from which the belt 17 enters. Since the belt 17 is moving in a counter-clockwise direction, for convenience, the rotational direction of the carrier 37 is referred to as the "reverse" direction, while the opposite direction, that is, the direction of the carrier 39 (to be described presently) is the same as that of the belt 17 and is accordingly termed the "forward" direction.

A roll 35 of web material is rotatably mounted on the carrier 37, advantageously with the axis of the roll 35 parallel to that of the mandrel 14 axis. Web material R leaving the roll 35 passes over a guide bar 38 which is carefully adjusted to deposit the web R onto the moving belt 17 in a plane tangential to the cylinder defined by the helically wrapped belt 17.

The rotational speed of the carrier 37 is selected so as to deposit a substantially non-overlapping ply of the web R onto the belt 17. This speed may be computed readily from the formulas to be discussed presently, and illustrative speeds for the disc or carrier 37 are given in a table included here. The axis of rotation of the carrier 37 coincides with the axis of the mandrel 14.

A second rotating disc or carrier 39 likewise rotates about the mandrel 14 in the same satellite-like manner as the first carrier 37, with the difference, however, that the carrier 39 rotates in a forward direction with respect to the belt 17.

Two webs X and Y are applied from the carrier 39. The web X is drawn from a web roll 47 journalled to the second carrier 39, while the web Y is withdrawn from a similar roll 48 on the carrier 39. Guide bars 52 and 53, corresponding in structure and function to the guide bar 38 of the first carrier 37, direct the respective webs X and Y onto the helix (formed by the mandrel 14, the wrapped belt 17 and optional superimposed foundation ply 36, and the deposited web R) in planes tangential to the helix.

As a result of helically depositing a first web R onto the helically moving belt 17 (and the optional foundation ply 36) in a reverse direction, and counter-depositing a second ply X, Y on top of the first ply or web R, a tube is formed with the various plies at angles with respect to each other determined by the relative angular positions of the belt and of the several plies with respect to the mandrel axis. Most importantly, the plies R and X, Y are each deposited at angles transverse to the length of the belt 17.

At this stage, the tube is severed in order to liberate the belt 17 and to produce the final multi-ply web product 10. The tube is thereupon cut along the edges of the belt 17 by a rotating cutter 54 provided with a knife or saw-like cutting edge adapted to cut through the plies R and X, Y. The product web 10 consequently has bias reinforcement in the direction parallel to the bias ply R and to the bias ply X, Y, and in the event there is a foundation ply 36 with longitudinally aligned fibers, the product ply 10 has strength in the machine direction also.

Where desired, a top ply (not shown) may be added after the crosslaying step to form a restraining overlay on the biased plies. This may best be effected before the plies are cut.

It was noted earlier that in the embodiment of FIGS. 1 and 2 only a single web R is applied by the first carrier 37 while two webs X, Y are applied by the second carrier 39. As may be seen best in FIG. 1, the product web 10 includes a sequence of adjacent bias plies R, preferably as closely spaced as possible but without substantially overlapping each other. In the opposite direction, the plies X, Y alternate in the product web 10, again as closely spaced as possible but advantageously without overlap. In other words, the plies R are derived from successive portions taken from a single roll 35, whereas the second set of bias plies X, Y are from successive webs X, Y taken from rolls 47, 48.

It usually is most convenient to have the widths of the plies X, Y equal to each other so that as the plies are successively withdrawn from their respective rolls 47, 48 the second carrier 37 remains in dynamic balance. With respect to the schematic embodiment of FIGS. 1 and 2, it is necessary that the carrier 37 rotate more rapidly than the second carrier 39. The relative speeds of rotation are governed by the bias angles $b$ and $b'$, all in a manner better described in a subsequent portion of this specification. Generally, however, bias angles $b$ and $b'$ are numerically equal to each other, for example 45° for 45° reinforcement and 60° for 60° reinforcement (isotropic product), in which case the unit area of the web R per unit time is equal to the sum of the unit areas per unit time of the webs X and Y.

Certain angular relationships among the mandrel 14 axis, the belt 17, and the webs R and X, Y are interrelated for the optimum practice of the present invention.

Angle $\theta$, the belt-mandrel axis angle, is the angle between the mandrel 14 axis and the direction of longitudinal movement of the belt 17. This angle is also the angle of inclination of the edge of the belt 17 to the line along which the belt 17 first contacts the mandrel 14.

Angle $a$ (or angle $a'$, as the case may be) is the webmandrel or "wrap" angle (see below). In other words, it is the angle between the long direction of movement of the web R (or the webs X, Y for $a'$) and the mandrel 14 axis, and is also the helix angle, or the angle of inclination of the edge of the web in question with the line along which the web begins to wrap the mandrel 14.

The bias angle $b$ (or $b'$) is the web-belt angle, and is mathematically derived from angles $\theta$ and $a$ and the relative speeds of the belt 17 and the webs R(or X, Y). This bias angle ($b$ or $b'$) is the angle formed by the long edge of the web in question with the edge of the belt 17. After operation of the cutter 15, it is also the angle formed by the original long direction of the web in question (R or X, Y) with the edge of the product web 10.

Although the discussion thus far has concerned the manufacture of multi-ply web products having either two bias plies (R and X, Y), or two bias plies plus an underlying foundation ply 36 if such is used, the principles of the invention are more broadly applicable. The respective plies thus may be of non-woven or of woven material, or of non-woven material with longitudinal or transverse thread reinforcement, etc. Further, each of the respective plies may include a latent adhesive which becomes active at the elevated temperature of the mandrel 14. Alternatively, either a thin layer of adhesive or incremental zones of adhesive may be applied from the respective carriers 37, 39 immediately before the corresponding webs R and X, Y are deposited onto the carrier belt 17 (or the superimposed foundation ply 36). If desired, only one of the two plies may be on the bias.

If desired, only one of the bias webs R or X, Y may be deposited. In this instance, a foundation ply 36 and/or a superimposed top web should be added to provide integrity in the product web 10.

More importantly, however, the principles of the present invention may be utilized to form a multi-ply web product where the bias plies, instead of being webs, are composed of a plurality of spaced-apart threads. Thus, in this case the resulting product web 10 is composed of any foundation ply 36 with cross biased plies composed of reinforcing threads. Such products, particularly when incorporating a foundation ply 36, are particularly useful inasmuch as the resulting product web 10 may have a foundation ply of carded, drawn or directly formed oriented fibers or split films which would ordinarily have essentially no transverse strength, but with at least one 45° bias ply composed of 45° to 60° bias-laid threads, the product web 10 now has exceptional transverse stretch and strength and is suitable for high quality garment manufacture.

In keeping with this aspect of the invention, directing attention to FIGS. 3 and 4, it is apparent that the relationship of a moving belt 17 helically wrapped around a mandrel 14 is maintained. Similarly, an optional foundation ply 36 comprising a web or an array of threads may be deposited on top of the belt 17.

Paralleling the use of a pair of rotating carriers 37, 39 in the FIG. 1 and 2 embodiment, the embodiment of FIGS. 3 and 4 utilizes rotating carriers 67 and 69. In this case it is more convenient however that the first carrier 69 rotate in a forward direction or, in other words, in the same direction as the belt 17 is wrapped around the mandrel 14. Similarly, the carrier 69 in FIGS. 3, 4 rotates in a reverse direction. Actually, however, this is optional, and the rotating carriers 67, 69 may rotate in directions opposite from those indicated in the drawings.

Instead of applying web material as in FIGS. 1, 2 the embodiment of FIGS. 3, 4 applies plies composed of a plurality of spaced-apart threads. To this end, the threads 68 applied by the carrier 67 are individually withdrawn from thread cones 65 of the carrier 67, each cone 65 delivering a single strand of thread material to a distribution comb, not shown, for uniform laying of the threads 68 onto the belt 17. A similar arrangement of thread cones 70 on the carrier 69 applies threads 71 in the second ply-laying operation. Instead of, or in addition to foundation ply 36, a top ply (not shown) may be added between or subsequent to the rotating carriers 67, 69. Preferably, the belt 17 makes an additional turn on the mandrel for this purpose. This ply may be of adhesively coated threads, for example.

It will further be apparent that the angular relationships of the thread-laying embodiment of FIGS. 3, 4 parallel those of FIGS. 1, 2. For simplicity, therefore, the discussion will refer only to the angles of the FIGS. 1, 2 embodiment, it being understood that whenever web width is discussed a corresponding width of "thread" is also contemplated. Further, to provide an additional example of the versatility of the invention, roll carriers such as carriers 37 or 39 of FIGS. 1, 2 may be combined with thread carriers such as carriers 67, 69 (FIGS. 3, 4) on a single mandrel 14 to deposit one or more layers of web material and one or more layers of thread material on the same belt 17. Otherwise stated, the principles of the invention are applicable to any flexible elongated medium whether composed of individual threads, a sheet or web, or combinations of the two.

Simple trigonometry interrelates the various angles, speeds, and widths for the embodiment of FIGS. 1 and 2 (and similarly for that of FIGS. 3 and 4). The fundamental relationship is:

$$\frac{WN}{\cos\theta \sin b} = \frac{S}{\sin(90+\theta-b)} = \frac{S}{\sin(90-\theta-b)}$$

Forward rotation   Reverse rotation

Where:
$W$ = Belt 17 width, in feet
$N$ = Disc or satellite carrier revolutions per minute.
$\theta$ = Angle between the long axis of the belt 17 and the long axis of the mandrel 14, i.e. "belt-mandrel axis angle". May also be considered as the angle between the mandrel 14 axis and the direction of longitudinal movement of the belt 17.
$b$ = Angle between cross-laid component or web and long axis of the belt 17. The "web-belt angle."
$S$ = Belt 17 speed, feet per minute.
"Forward" indicates disc or satellite carrier 33 rotation in the same direction as the rotation of the helix formed by the belt 17 as it slides about the mandrel 14. "Reverse" indicates opposite rotation.

Other relationships:

$$b \mp \theta = a$$

Where $a$ is the "wrap angle" or the helix angle formed by the cross-laid component and the long axis of the mandrel. Subtract $\theta$ for forward rotation; add $\theta$ for reverse rotation. Note that as $a$ approaches 90°, disc speed approaches infinity.

$$D = W/\pi \cos\theta$$

Where $D$ is the mandrel diameter in feet.

$$W/H = \sin\theta$$

$H$ = Length of one complete helical (360°) wrap of the carrier member along the mandrel. The preceding two relations between belt width $W$ and belt-mandrel angle $\theta$ also apply to the bias-web width and the bias-web angle $a$. That is, the width $W$ of the bias web $R$ may be determined by the formula $$W_R = \pi D \cos a = W \cos a/\cos\theta$$

Since the other bias component is formed by two webs $X$, $Y$, the corresponding relationship may be expressed as $$2W_X = \pi D \cos a' = W(\cos a')/(\cos\theta)$$

A summary of representative values for a machine utilizing a belt 17 speed of 500 feet per minute is given in the attached table entitled "Cross Layer Relationship," which relates disc or carrier 37, 39 speed with belt 17 width, mandrel 14 diameter, thread-mandrel wrap angle $a$, and thread-belt angle $b$.

These values are plotted on FIG. 5, which is useful for estimating carrier rotations for bias angles other than those given in the table.

CROSS-LAYER RELATIONSHIPS

| | $\theta=45°$ | | | | $\theta=30°$ | | | | $\theta=20°$ | | | |
|---|---|---|---|---|---|---|---|---|---|---|---|---|
| Belt width W | 45″ | 60″ | 80″ | | 45″ | 60″ | 80″ | | 45″ | 60″ | 80″ | |
| Mandrel dia. D | 20.3″ | 27″ | 36″ | a | 16.5″ | 22″ | 29.4″ | a | 15.2″ | 20.3″ | 27.1″ | a |
| b: Disc r.p.m. "N" for 500 f.p.m. belt speed "S" | | | | | | | | | | | | |
| 90° | 133 | 100 | 75 | 45° | 231 | 173 | 130 | 60° | 366 | 275 | 206 | 70° |
| 60° | 84.5 | 63.4 | 47.5 | 15° | 115 | 86.6 | 65 | 30° | 141.5 | 106 | 79.5 | 40° |
| 45° | 67 | 50 | 37.5 | 0° | 81.5 | 63.4 | 47.5 | 15° | 98 | 73.4 | 55 | 25° |
| 0° | 0 | 0 | 0 | 45° | 0 | 0 | 0 | 30° | 0 | 0 | 0 | 20° |
| 45° rev. | Inf. | Inf. | Inf. | 90° | *315 | *237 | *177 | 75° | *210 | *157 | *118 | 65° |
| 60° rev. | | | | | Inf. | Inf. | Inf. | 90° | *355 | *267 | *200 | 80° |
| 90° rev. | | | | | | | | | | | | |

*Rev.  N=disc r.p.m.  S=belt speed, f.p.m.  W=belt width, inches.  $\theta$=belt-mandrel axis angle.  a=thread- or web-mandrel wrap angle.  b=thread- or web-belt angle.  D=mandrel diameter, inches.

A simple illustration will perhaps clarify the use of the foregoing table. For example, assume it is desired to lay bias webs at 45° angles with respect to the long dimension of a product web 10. Assume further that an endless carrier belt 17 travels at 500 feet per minute, is 60 inches wide, and intersects the mandrel 14 at a belt-mandrel angle $\theta$ of 20°. The carrier 37 rotates in a reverse direction at 157 RPM while the carrier 39, carrying two rolls 47, 48 of equal width web material, rotates in a forward direction at 73.4 RPM. (Actually, the belt-mandrel axis angle $\theta$ may vary between the theoretical limits of 45° and 0°. In practice, however, angles of between about 10° and 30° are preferred, with angles between about 15° and 25° being optimum.)

By trigonometry, the desired widths of the webs $R$ and $X$, $Y$ are determined from the relationship between the product web widths 10 (equal to the carrier belt width 17) and the helix angles $\theta$, $a$ and $a'$. Bias web widths calculated from the above formulas and the preceeding dimensions illustratively are:

$W_R = 27.0$ inches     $(a = 65°)$
$W_X = 28.9$ inches     $(a' = 25°)$

The web widths noted above may be increased slightly, depending upon the amount of overlap desired along their adjacent edges. This provides some assurance that gaps will not develop due to occasional shifts in machine alignment and web guiding. Still greater regions of overlap may be obtained where desired simply by increasing the width of webs $R$, $X$ and $Y$.

It should also be noted that webs $X$ and $Y$ may be replaced by a single web 57.86 inches wide and rotating at the same angular velocity and direction as webs $X$, $Y$. This, however, may be cumbersome to handle and represents an unbalanced load in the rotating carrier.

Where webs $R$, $X$, $Y$ come from a common source of supply, it will be most economical to have a common supply width, rather than the odd widths noted above. To accomplish this, one must adjust helix angle $\theta$. By solving the formulas noted earlier, a helix angle of 18° 26' (instead of 20°) will provide identical widths of 28.28 inches for webs $R$, $X$ and $Y$. If overlapping is required, some further adjustment in helix angle may be made to permit use of a common supply web-width.

The mandrel diameter may also be computed according to the previous formulas, and illustrative mandrel diameters are given in the table. It should be noted, however, that the computed and reported mandrel diameters assume a carrier belt 17 thickness of negligible value. Should the belt 17 have a substantial thickness, the actual mandrel 14 diameter should be reduced from the calculated diameter by an amount equal to twice the belt thickness. Ordinarily, the thickness of any optional foundation ply 36 can be ignored, but should this become substantial it too can be doubled and deducted from the computed mandrel diameter to derive the actual mandrel diameter.

It will be apparent from a study of these relationships that the choice of a given belt-mandrel angle $\theta$ will depend on the range of web-belt, or bias lay, angles ($b$ and $b'$) desired in the finished product web 10. Generally, bias angles of between about 45° and about 75° are the most desirable for a web product of this general type, although larger and smaller angles may be achieved.

Where two rotating carriers 37, 39 are used to apply the webs, the carriers will rotate at different speeds, depending upon the bias angle desired. Generally, but not necessarily, the directions of rotation will be opposed, that is, one carrier rotating in the "forward" direction of the helix and the other rotating counter to the helix. Reversed disc rotation may be employed to apply bias angles up to about 60° before reaching excessively high rotational speeds of the carrier 37. In all cases, it is desirable that the webs be wrapped onto the helix at an angle $a$ of at least 15° with respect to the mandrel 14 axis. This insures that tension applied during wrapping will be effective to bring the components into firm contact with the underlying carrier belt 17.

When laying arrays of thread or yarns at various angles, as in the embodiment of FIGS. 3 and 4, the "spread" of a given number of threads applied by each revolution of the carrier 67, 69 will vary automatically with changes in angle. A given thread count per inch may be regulated by changing the number of threads served from the rotating carrier or creel 67, 69.

When laying webs as in the embodiment of FIGS. 1 and 2, the widths of webs served by each carrier is predetermined according to the web-mandrel, or wrap angle $a$ formed by the web and the mandrel 14. Webs narrower than this will leave gaps between adjacent webs in the finished product web 10 and, conversely, wider webs will provide overlaps. As previously noted, this may or may not be desirable, depending upon the purpose for which the product web 10 is intended.

Where, in keeping with the invention, two or more rotating carriers are employed, an intermediate means may be used to hold the successive biased components together, as for example adhesively coated threads, hot melt filaments, print lines, adhesive spray or the like, applied to the first-wrapped web or ply before the second ply is deposited. Alternatively, one or both of the bias web components, or the carrier belt 17 (or the optional foundation ply 36 or top ply 36') may include an adhesive thread, band, or pattern of activatable adhesive for temporary or permanent bonding of the product components.

A wide variety of elements may be combined in the manner above described. Spaced threads or yarns, webs of spread tow or drawn staple, carded or un-carded fibers, directly formed fiber webs, beamed arrays, creped tissues, paper, films, split film arrays and the like may be assembled in varied combinations, depending up on the desired properties of the finished product. Also, the webs may be either reinforced or non-reinforced prior to introduction into the inventive apparatus.

The reinforcing bias webs may be balanced or unbalanced, that is, angles $b$ and $b'$ in FIG. 1 may be identical or different. In most instances a balanced criss-crossed construction will be desirable. For example, reinforcing elements crossing each other at 90° and laid at 45° to the long dimension of the belt 17 provide stretch and conformability in the finished product. Alternatively, opposed sets of reinforcing bias webs or other elements may be laid at 60° to the long dimension of the belt 17 and combined with other reinforcements extending parallel to the long dimension. This provides an isotropically reinforced product. Non-reinforced webs may also be cross-laid to obtain high bulk and special orientations of strength and stretch.

Non-symmetrical reinforcements may be desired for unique purposes. For example, one layer of 45° biased reinforcement may be wound onto the carrier and bonded to form a self-sustaining web. Subsequently, by folding this web onto itself, a crossed 45° reinforced product is obtained. Also, when the biased reinforcing webs are used, they need not be laid side-by-side but may overlap themselves by any desired amount to produce more heavily reinforced materials or an overlapped unidirectional web when slit. The overlapped portions can then be bonded as laid by spraying adhesive between the overlapped portions.

Thus, it is apparent that there has been provided, according to the invention, a unique and highly advantageous method and apparatus which fully satisfies the objects, aims, and advantages as set forth earlier.

I claim as my invention:

1. Apparatus for forming a multi-ply web product having at least two plies at different angles with each angle being acute relative to the longitudinal dimension of the web, comprising:

means for moving a first flexible elongated medium helically about a generally cylindrical mandrel at an angle between about 10° and 30° between said first medium and the mandrel axis, means for depositing a second elongated flexible medium helically on said first medium while said first medium is on said mandrel, and at an angle between said second medium and the mandrel axis different from the angle between said first medium and the mandrel axis, means for depositing a third elongated flexible medium helically on said second medium while said first medium and said second medium are on said mandrel and at an angle between said third medium and the mandrel axis different from the angle between said second medium and the mandrel axis, said depositing means each including a rotatable carrier having an axis of rotation coincident with the mandrel axis and means for rotating said carriers at different speeds and in opposite directions, means for cutting at least said second medium along the edges of said first medium to produce a multi-ply web product having at least two plies at different angles within said web product and means for bonding said plies together.

2. Apparatus of claim 1 wherein said first flexible elongated medium comprises an endless belt.

3. Apparatus of claim 2 wherein said first flexible elongated medium moving means includes means for supplying a ply superimposable onto said endless belt.

4. Apparatus of claim 1 wherein the angle between said first flexible elongated medium and the mandrel axis is between about 15° and 25°.

5. Apparatus of claim 1 wherein at least one of said second elongated flexible medium and said third elongated flexible medium is a web, and the corresponding rotatable carrier includes at least one web supply roll and at least one web guide bar.

6. Apparatus of claim 1 wherein at least one of said second elongated flexible medium and said third elongated flexible medium is a plurality of threads, and the corresponding rotatable carrier includes a plurality of thread supply cones.

7. Method of forming a multi-ply web product having at least two plies at different angles with each angle being acute relative to the longitudinal dimension of the web, comprising:
moving a first flexible elongated medium helically about a generally cylindrical mandrel at an between angle of about 10° and 30° between said medium and the mandrel axis,
depositing a second elongated flexible medium helically on said first medium while said first medium is on said mandrel, and at an angle between said second medium and the mandrel axis different from the angle between said first medium and the mandrel axis, depositing a third elongated flexible medium helically on said second medium while said first medium and said second medium are on said mandrel, and at an angle between said third medium and the mandrel axis different from the angle between said second medium and the mandrel axis,
said second and third mediums being wound helically about said mandrel at different speeds and in opposite directions,
cutting at least said second medium along the edges of said first medium to produce a multi-ply web product having at least two plies at different angles within said web product and bonding said plies together.

8. Method of claim 7 wherein said second elongated flexible medium is deposited in the opposite direction from said first elongated flexible medium.

9. Method of claim 7 wherein said third elongated flexible medium is deposited in the same direction as said first elongated flexible medium.

10. Method of claim 7 wherein said first elongated flexible medium comprises an endless belt and a superimposed ply, and said second elongated flexible medium and said third elongated flexible medium are deposited respectively at predetermined speeds and angles whereby the resulting web product has three plies, two being each at 60° angles with respect to said web product but in opposite directions.

11. Method of claim 7 wherein said second elongated flexible medium and said third elongated flexible medium are deposited respectively at predetermined speeds and angles whereby the resulting web product has at least two plies, one each being at 45° angles with respect to said web product but in opposite directions.

* * * * *